(12) United States Patent
Hsu

(10) Patent No.: US 6,668,673 B2
(45) Date of Patent: Dec. 30, 2003

(54) BALL SCREW WITH BALL RETAINER CAGE

(75) Inventor: Slady Hsu, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 119 days.

(21) Appl. No.: 09/964,556

(22) Filed: Sep. 28, 2001

(65) Prior Publication Data

US 2002/0043122 A1 Apr. 18, 2002

(30) Foreign Application Priority Data

Oct. 13, 2000 (TW) ........................................ 89121373 A

(51) Int. Cl.$^7$ .............................................. F16H 55/22
(52) U.S. Cl. ................ 74/424.88; 74/87.23; 74/424.71; 74/424.81; 384/49
(58) Field of Search ........................... 384/49, 51, 521, 384/523, 528, 530, 534, 572, 575; 74/89.23, 112, 127, 424.71, 424.81, 424.82, 424.88, 424.89, 424.95

(56) References Cited

U.S. PATENT DOCUMENTS

| 1,821,873 | A | * | 9/1931 | Best .......................... 384/49 X |
|---|---|---|---|---|
| 2,711,655 | A | * | 6/1955 | Schottler ................... 74/424.71 |
| 2,715,925 | A | * | 8/1955 | Morgan ..................... 384/51 X |
| 3,214,993 | A | * | 11/1965 | Teramachi ................ 74/424.71 |
| 4,080,011 | A | * | 3/1978 | Wilke et al. ............. 74/424.71 |
| 4,339,157 | A | * | 7/1982 | Olschewski et al. ...... 384/49 X |
| 4,357,056 | A | * | 11/1982 | Olschewski et al. ...... 384/51 X |
| 4,542,661 | A | * | 9/1985 | Teramachi ................ 74/424.71 |
| 5,178,474 | A | * | 1/1993 | Muntnich et al. ........... 384/577 |
| 5,290,107 | A | * | 3/1994 | Hanaway ..................... 384/49 |
| 6,116,109 | A | * | 9/2000 | Zernickel ................. 74/424.71 |
| 6,238,098 | B1 | * | 5/2001 | Knoll et al. ................. 384/572 |
| 6,439,072 | B1 | * | 8/2002 | Kajita et al. ............... 74/89.23 |

FOREIGN PATENT DOCUMENTS

DE            4220585 A1 *   1/1994

* cited by examiner

Primary Examiner—Thomas R. Hannon
Assistant Examiner—Colby Hansen
(74) Attorney, Agent, or Firm—Rosenberg, Klein & Lee

(57) ABSTRACT

A ball screw with ball retainer cage equipped between the screw bolt and the nut body is disclosed. The adjacent balls can move without squeezing each other and well protected in the retainer cage from dropping off therefrom when the retainer cage is disintegrated from the screw bolt and the nut body simultaneously. The total length of the ball screw assembly can be shortened to make the assembly compact in size. In addition, the specification of the product can be standardized to facilitate mass production with a reduced cost employing die casting process.

6 Claims, 6 Drawing Sheets

BALL SCREW WITH BALL RETAINER CAGE

BACKGROUND OF THE INVENTION

1. Field of the Invention

The present invention relates to a ball screw with ball retainer cage equipped between the screw bolt and the nut body so as to isolate two adjacent rolling balls and retain the ball therein even they roll out of the track encircled by the nut body.

2. Description of the Prior Art

A conventional ball screw assembly comprises a screwbolt, a nut unit, and a plurality of rolling balls interposed between the screw bolt and the nut unit. The outer surface of the screw bolt is formed into an arcuate groove spirally encircling thereof. The nut unit is composed of a nut body and accessories for ball circulation. The nut body is formed into a hollow structure to be sleeved over the screw bolt, and the inner surface of the nut body is also formed into a spiral arcuate groove corresponding to that formed on the screw bolt such that the nut assembly is able to displace linearly along longitudinal direction of the screw bolt by mutual rotation of the two components with the aid of the rolling balls rolling therebetween. Although such a movement of the nut assembly is not limited by length of the screw bolt, it is subjected to a large resistance by a frictional force between the rolling balls. This frictional force is not negligible owing to the fact that the rolling balls advance pushing and squeezing along the spiral grooves on which they are unsmoothly contacted. As a result, the durability of the ball screw assembly will be severely affected especially by large instantaneous load variation including abrupt change of rolling direction.

FIG. 10 is a view of an improved ball screw disclosed by U.S. Pat. No. 4,542,661, and FIG. 11 is a cross sectional view cut along line 11—11 of FIG. 10. As shown in the two drawings, spiral grooves 11 and 21 are formed on the outer surface of the screw bolt 1 and the inner surface of the nut body 2 respectively. A flange 22 is provided for the nut body 2 for coupling with another device. It is seen that a ball retainer cage 4 with a plurally of retainer holes is provided for isolating adjacent balls so as to prevent mutual collision. However, with this structure, there is no way to prevent balls from dropping down from the groove 11 of the screw bolt 1 except in the region where they are surrounded by the groove 21 of the nut body 2. In the construction illustrated in FIG. 10, a sleeve 5 is enclosed over the nut body 2 to prevent balls 3 from dropping down. The length of the sleeve 5 is estimated to be about half as long as that of the nut body's stroke. As the sleeve 5 is fixedly secured to the nut body 2, it moves together with the nut body 2. As long as the nut body 2 advances to reach the ultimate point, the sleeve 5 is unavoidably projected ahead of the ultimate point to interfere with a bearing base (not shown) of the ball screw assembly 1. To avoid the aforesaid inconvenience, the distance between the bearing base and the ultimate point of the stroke must be at least 5 times longer than the length of the sleeve 5. Thus, the overall size of the ball screw assembly becomes too bulky, and fabrication cost is exhorbitantly increased.

SUMMARY OF THE INVENTION

It is an object of the present invention to provide a ball screw with ball retainer cage which can keep rolling balls working with out squeezing one another and save installation of the protective sleeve as that is done in the above cited case.

It is another object of the present invention to provide a ball screw with ball retainer cage which can prevent the rolling balls from dropping off the retainer cage when the retainer cage is disintegrated from the screw bolt and nut body at the same time.

It is one more object of the present invention to provide a ball screw with ball retainer cage which can shorten the length of the ball screw assembly.

It is still one more object of the present invention to provide a ball screw with ball retainer cage which can be standardized to facilitate mass production with a reduced cost by die casting.

To achieve these and other objects mentioned above, a rolling ball retainer cage is formed between the screw bolt and the nut body with a plurality of retainer holes therein. Each rolling ball occupies one retainer hole so that the two adjacent balls are kept isolated. An extended portion is formed at the outer side of the retainer cage along a spiral groove of the nut body, a protrusion is further formed from both sides of the extended portion at each retainer hole to prevent the rolling ball therein from dropping off outwardly, also another extended portion is formed at the inner side of the retainer cage along a spiral groove of the screw bolt, and a protrusion is further formed from both sides of the extended portion at each retainer hole to prevent said rolling balls therein from dropping off inwardly.

For linking the adjacent rolling ball retainer cages, a joint hole is provide at both ends of the retainer cage so as to connect two terminals thereof with a connecting belt.

For facilitating mass production with a reduced cost, the ball retainer cage is fabricated by extrusion after process of die casting.

BRIEF DESCRIPTION OF THE DRAWINGS

The accompanying drawings, which are included to provide a further understanding of the invention and incorporated in and constitute a part of this specification, illustrate embodiments of the invention and together with the description serve to explain the principles of the invention, wherein.

DETAILED DESCRIPTION OF THE PREFERRED EMBODIMENT

Figure 1:
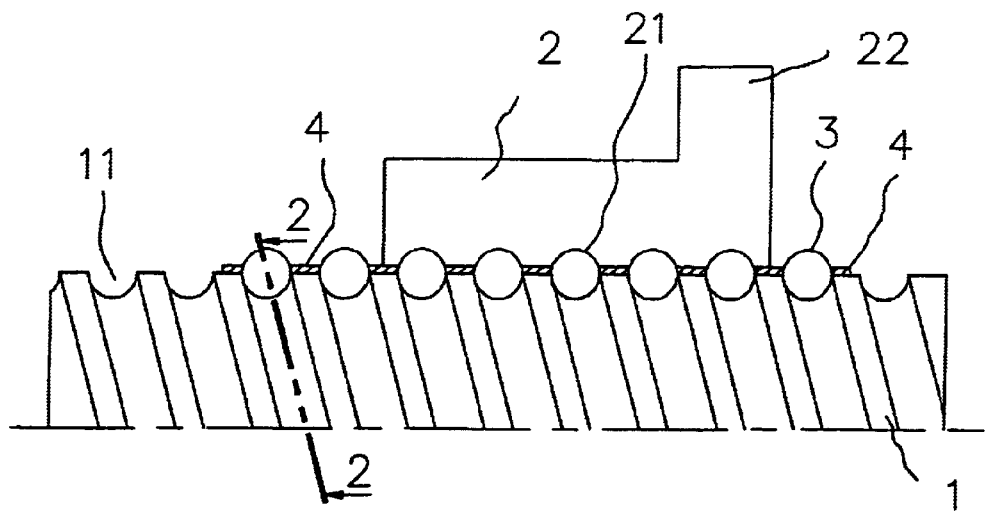
FIG. 1 is a schematic view of a ball screw with ball retainer cage of the present invention.

FIG. 1 is a schematic view of a ball screw with ball retainer cage of the present invention. As shown in FIG. 1, the present invention comprises a screw bolt 1 and a nut body 2. A spiral groove 21 formed on the nut body 2 is situated at the outer side of a spiral groove 11 formed on the screw bolt 1, and the two grooves 11 and 21 are coupled together to provide a moving pathway for rolling balls 3. A ball retainer cage 4 is formed between a clearance remaining between the screw bolt 1 and the nut body 2. A plurality of ball retainer holes 41 are formed on the retainer cage 4 along the pathway to each accommodate a ball 3. In this version, adjacent balls 3 are isolated by the retainer cage 4 so that there is no friction or collision therebetween. In the present invention, there is no sleeve provided to enclose the nut body 2 so that there is no problem of exhorbitantly increasing the sized of the ball screw assembly and fabrication cost. When the screw bolt 1 and the nut body 2 are rotating with respect to each other, the balls 3 rotate with respect to the screw bolt 1 at a speed half that of the screw bolt 1 and nut body 2. For enabling the nut body 2 to contact as many balls 3 as possible, the length of the ball retainer cage 4 must be increased ½ length of the stroke of the nut body 2 with respect to the screw bolt 1. Due to the fact that there is no sleeve provided for the nut body 2, and the retainer cage 4 is significantly longer than the nut body 2, the structure of the retainer cage 4 is carefully designed in order not to allow the balls 3 to drop off the groove 11 of the screw bolt 1.

Figure 2:
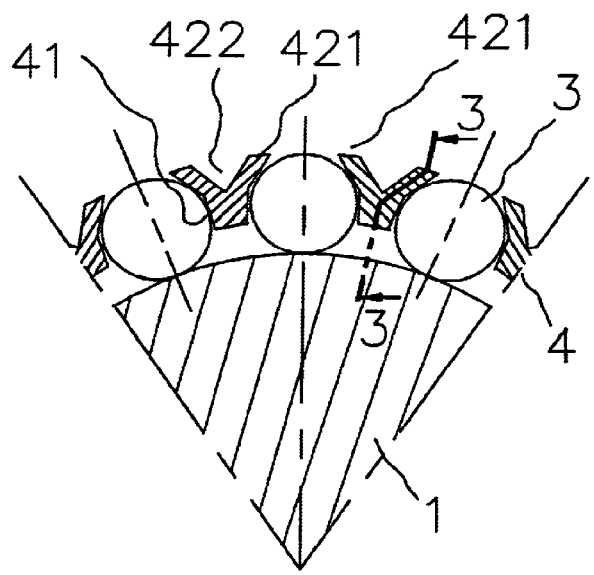
FIG. 2 is a partial cross sectional view cut along line 2—2 of FIG. 1.
Figure 3:
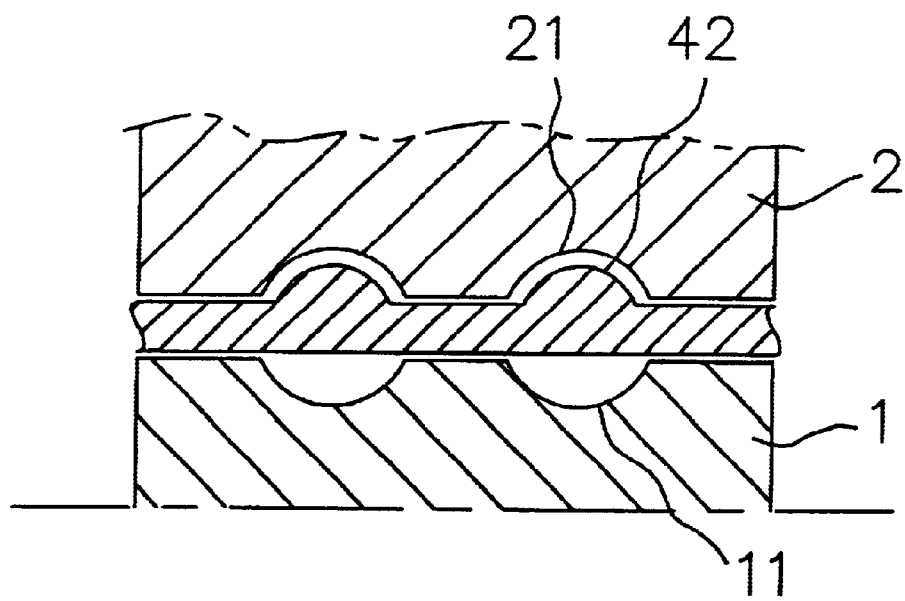
FIG. 3 is a partial cross sectional view cut along line 3—3 of FIG. 2.

In order to understand the structure of the ball retainer cage 4, refer to FIG. 2, a view cut along line 2—2 of FIG. 1; and FIG. 3, a partial cross sectional view cut along line 3—3 of FIG. 2. As shown in FIG. 3, an extended portion 42 is formed in a ball retainer cage 4 within the region encircled by the spiral groove 21 of the nut body 2. This extended portion 42 formed at the outer side of the ball retainer cage 4 facing the recessed part of the spiral groove 21 never interferes with the nut body 2 when the screw bolt 1 and the nut body 2 spirally rotate with respect to each other, as the groove 21 itself is a spirally recessed structure. If the extended portion 42 is viewed from an angle as shown in FIG. 2, the spirally disposed extended portion 2 is divided by the retainer holes 41 into a plurality of smaller sections. From both sides of the retainer hole 41, a protrusion 421 is extended to retain the ball 3 in the cylindrical retainer hole 41, and to not drop off.

There are three processes for fabricating the retainer hole 41 including the protrusions 41 according to the present invention. First, Using a drill to bore a through hole having a diameter less than that of the retainer hole not including the protrusions 421, and then using a chamfering knife to finish up the through hole into the retainer hole. As the efficiency is low, this process fits only for small production scale. Second, forming a retainer hole 41 on the ball retainer cage 4, and then forming a notch 422 on the extended portion 42 between two adjacent retainer holes 41 by extrusion or hammering (See FIG. 2). In forming the notch 422, the outer side structure of the retainer hole 41 is forced to move inwards so as to form a protrusion 421. The process is also suitable for small production scale by reason that forming of each retainer hole 41 has to rely on drilling. The third process, forming the ball retainer cage 4 together with the retainer holes 42 by molding or die casting, is most favorably suitable for mass production and cost saving. In this process, for easily parting from the mold, the protrusions 421 at both sides of the retainer hole 41 are temporary extended outward along the wall of the retainer hole 41 so as to avoid interfering de-molding, afterwards, the protrusions 421 are squeezed back to the retainer hole 41 by rolling.

Figure 4:
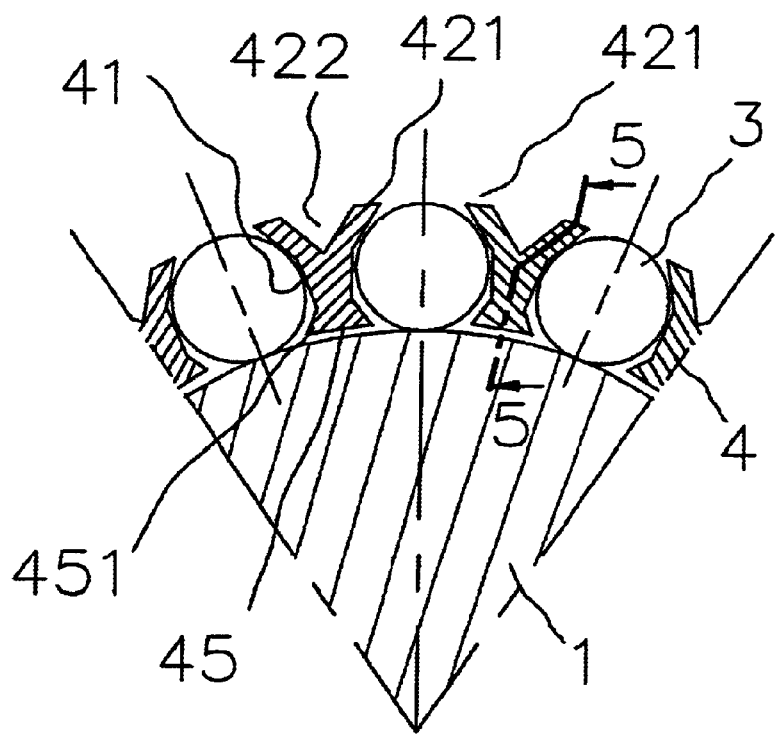
FIG. 4 is a schematic view of a ball screw with ball retainer cage in a first embodiment of the present invention.
Figure 5:
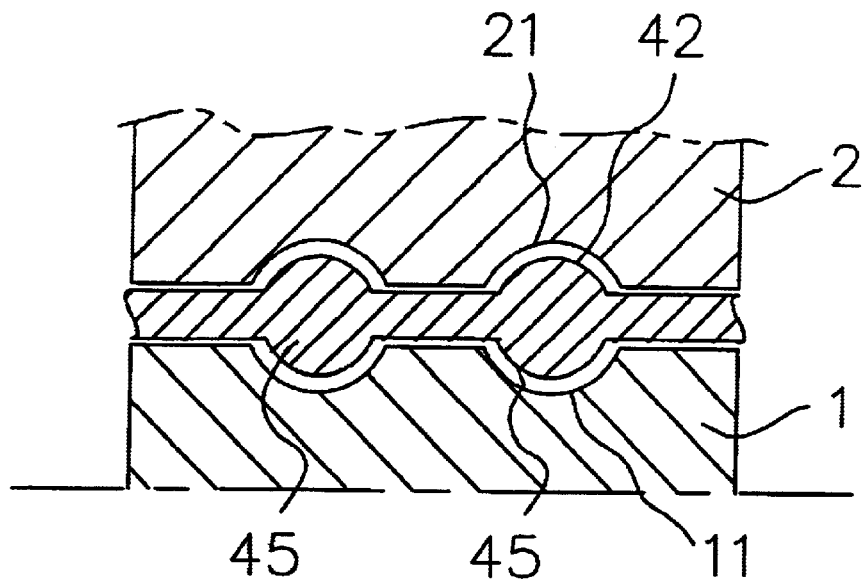
FIG. 5 is a partial cross sectional view cut along line 5—5 of FIG. 4.

FIG. 4 is a schematic view in a first embodiment of the present invention; and FIG. 5 is a partial cross sectional view cut along line 5—5 of FIG. 4. As shown in FIG. 4, the retainer hole 41 has a smaller diameter than that of the ball 3 near the inner part (at 451) of the ball retainer cage 4 so that the ball 3 cannot pass through the retainer hole 41 from the outer side of the retainer cage 4, and drop off from the inner side of the retainer cage 4. With this structure, the balls 3 are always retained in the retainer cage 4 even if the cage 4 is separated from both the screw bolt 1 and the nut body 2, thereby facilitating re-assembly and necessary adjustment. In FIG. 5, it is clearly shown that the inner part of the retainer hole 41 has a diameter smaller than that of the ball 3. An inner extended portion 45 is formed at a recess in the inner side of the ball retainer cage 4 along the groove 11 of the screw bolt 1, and a protrusion 451 of the inner extended portion 45 prohibits the ball 3 from dropping out of the retainer hole 41 at the inner side of the retainer cage 4. In this embodiment, as the ball 3 cannot be simply passed through either the outer side or the inner side of the retainer cage 4 for placement into the retainer hole 41, one of the ways to put the ball 3 into the retainer hole 41 is by doing so from the outer side thereof before forming the protrusion 421 at that outer side of the extended portion 42 by extrusion or hammering.

Figure 6:
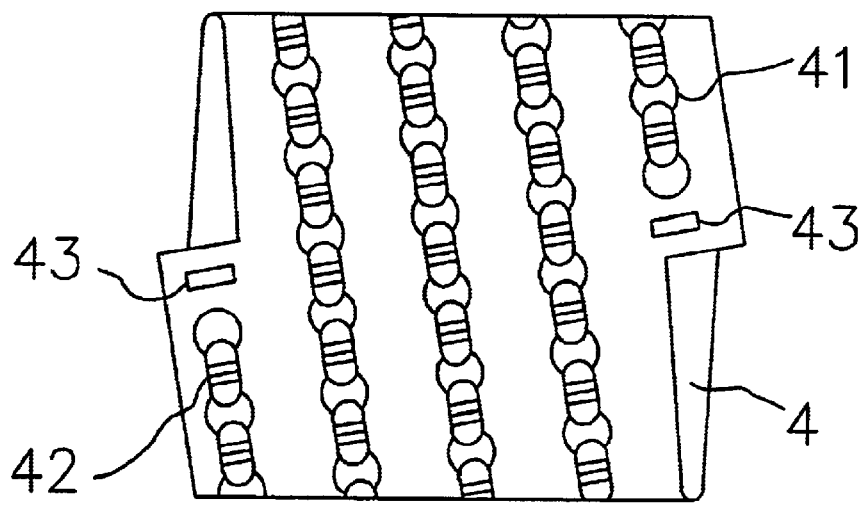
FIG. 6 is a schematic view of a ball screw with ball retainer cage in a second embodiment of the present invention.

As there is a fixed relationship among the length of the retainer cage 4, the length of the nut body 2, and the stroke of the nut body 2. This is disadvantageous to fabricate a long retainer cage 4 by mechanical process. Besides, it is not realistic to prepare a plurality of molds for the retainer cages 4 with various lengths should die casting process be selected. The present invention has provided a solution to this problem which is shown in FIG. 6, a second embodiment of the present invention. As shown in FIG. 6, the retainer holes 41 and the extended portions 42 are mutually connected one after another in a spiral form with each end connected to a terminal joint hole 43 provided at each end on the spiral track so as to be linked to the adjacent retainer cage 4.

Figure 7:
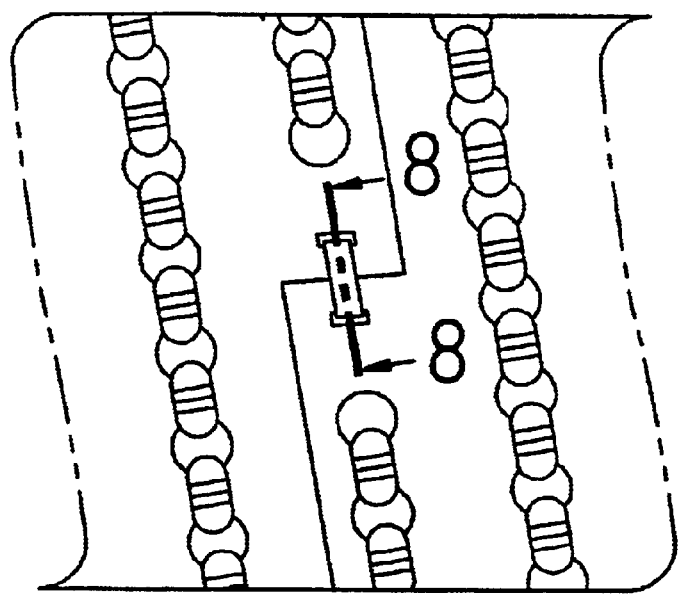
FIG. 7 is a schematic view illustrating linking of two ball retainer cages of the present invention.
Figure 8:
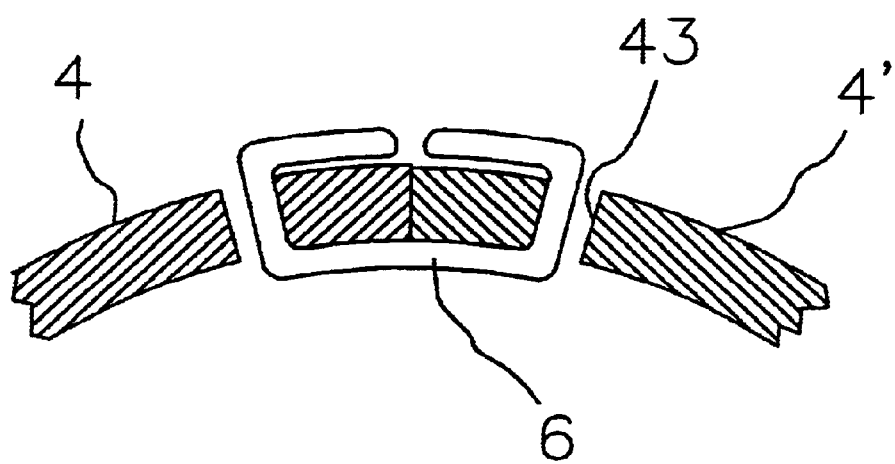
FIG. 8 is a partial cross sectional view cut along line 8—8 of FIG. 7.

FIG. 7 is a schematic view illustrating the linking of two ball retainer cages 4, and FIG. 8 is a partial cross sectional view cut along line 8—8 of FIG. 7. As shown in FIG. 8, a connection belt 6 is fastened between the left retainer cage 4 and the terminal joint hole 43 of the right retainer cage 4'. With this construction, the connection belt 6 is situated just above the groove 21 of the nut body 2 such that its outward and inward protruded portions are just in the groove 21 of the nut body 2 and in the groove 11 of the screw bolt 1, thereby avoiding interference with the operation of the ball screw assembly. The connection belt 6 is preferably made of a metallic material for providing the necessary degree of flexibility.

Figure 9:
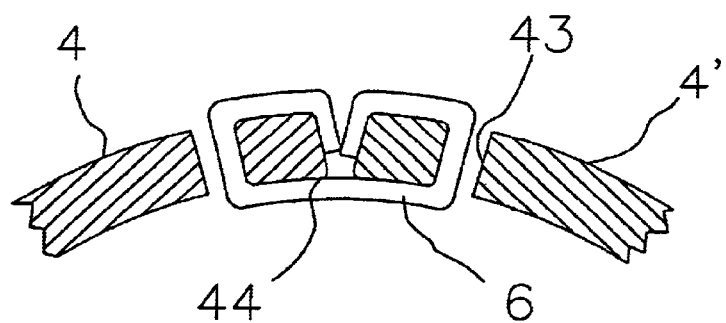
FIG. 9 is partial cross sectional view illustrating one of the linking state of the ball retainer cage in a third embodiment of the present invention.
Figure 10:
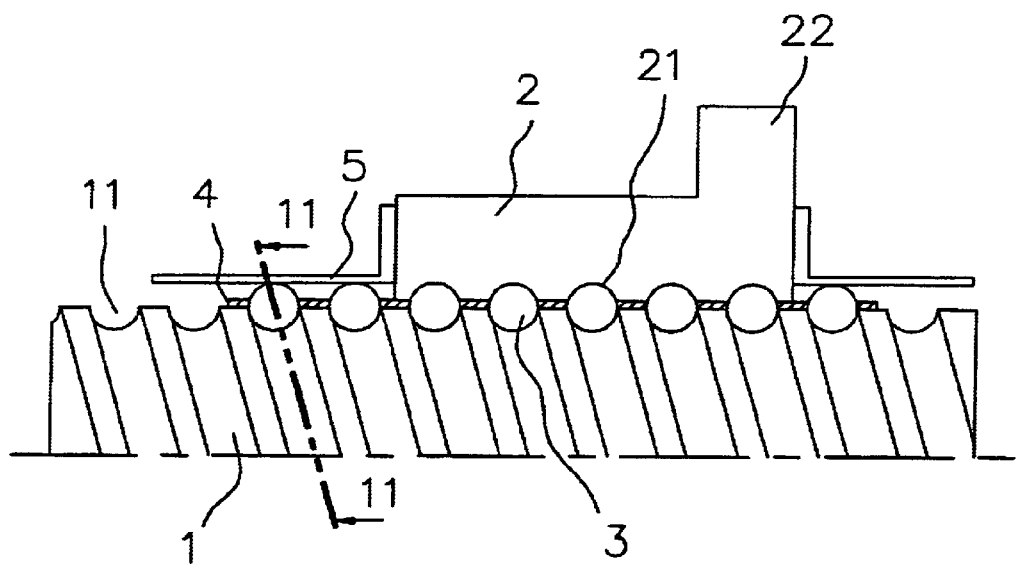
FIG. 10 is a schematic view of a conventional ball screw with ball retainer.
Figure 11:
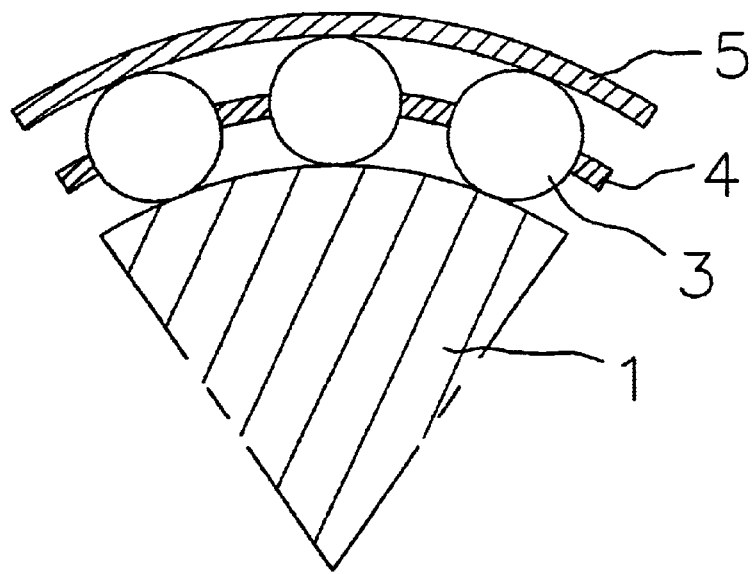
FIG. 11 is a cross sectional view cut along line 11—11 of FIG. 10.

FIG. 9 is a partial cross sectional view in a third embodiment of the present invention. In this embodiment, another linking method of the retainer cage is disclosed wherein the joint hole 43 between two adjacent retainer cages 4 and 4' is provided with an additional vacancy space 44 for insertion of both tails of the connection belt 6 thereinto and securing it thereof.

It is therefore understood that the ball screw with ball retainer cage according to the present invention has the following noteworthy advantages;

1. The rolling balls can move without squeezing one another and save installation of the protective sleeve as that is done in the above cited case.

2. The rolling balls are well protected in the retainer cage from dropping off therefrom when the retainer cage is disintegrated from the screw bolt and the nut body at the same time.

3. The total length of the ball screw assembly can be shortened.

4. The specification of the product can be standardized to facilitate mass production with a reduced cost by die casting.

Many changes and modifications in the above described embodiments of the invention can, of course, be carried out without departing from the Scope thereof. Accordingly, to promote the progress in science and the useful arts, the invention is disclosed and is intended to be limited only by the scope of the appended claims.

What is claimed is:

1. A ball screw with ball screw retainer cage comprising:
a screw bolt having a spiral groove formed along an outer surface thereof;
a hollow nut body being sleeved over said screw bolt, having a spiral groove formed along an inner surface thereof, corresponding to the spiral groove of said screw bolt;
a plurality of rolling balls interposed in said grooves of said screw bolt and said nut body; and,
a plurality of rolling ball retainer cages disposed between said screw bolt and said nut body, each said retainer cage defining a plurality of retainer holes, each rolling ball occupying one said retainer hole so that adjacent ones of said rolling balls are kept isolated one from the other, an extended portion being formed at an outer side of said retainer cage along said spiral groove of said nut body, a protrusion being formed from both sides of said extended portion at each said retainer hole to prevent said rolling ball received therein from dropping off outwardly;
each said retainer cage having a joint hole provided at an end portion thereof, adjacent ones of said retainer cages being linked together by a connecting belt engaging said joint holes thereof.

2. The ball screw of claim 1, wherein an extended portion is formed at the inner side of said ball retainer cage along the spiral groove of said screw bolt, and protrusions are formed from both sides of said extended portion at each retainer hole to prevent said rolling balls therein from dropping off inwardly.

3. The ball screw of claim 1, wherein a notch is formed at the outer side of said extended portion formed on said ball retainer cage.

4. The ball screw of claim 1, wherein said ball retainer cage is made of a metallic material.

5. The ball screw of claim 4, wherein said metallic material is selected from the group consisting of: copper, aluminum, and alloys thereof.

6. The ball screw of claim 1, wherein said ball retainer cage is fabricated by extrusion after die casting.

* * * * *